United States Patent [19]

Zawislak

[11] 3,927,894

[45] Dec. 23, 1975

[54] BEACH AND SNOW SLED

[75] Inventor: Phyllis D. Zawislak, Huntington, N.Y.

[73] Assignee: The Raymond Lee Organization, Inc., New York, N.Y. ; a part interest

[22] Filed: Jan. 14, 1975

[21] Appl. No.: 541,004

[52] U.S. Cl............................. 280/8; 280/47.26
[51] Int. Cl.²........................................ B62B 13/18
[58] Field of Search ......... 280/19, 8, DIG. 3, 47.26, 280/47.3

[56] References Cited
UNITED STATES PATENTS

| | | |
|---|---|---|
| 524,210 | 8/1894 | Peter....................................... 280/8 |
| 2,208,347 | 7/1940 | Stuart..................... 280/8 |
| 3,046,031 | 7/1962 | Reynolds ............................. 280/8 |
| 3,774,931 | 11/1973 | Stelniceanu.................... 280/DIG. 3 |

Primary Examiner—Leo Friaglia
Assistant Examiner—Michael J. Forman
Attorney, Agent, or Firm—Howard I. Podell

[57] ABSTRACT

A sled that may be used for the transportation of packages on sand or on snow that may also be rolled over solid ground. The sled is in the form of a U-shaped section of sheet material, with sides, that is fastened at each end to a set of handle frames. A set of wheels is mounted on one side of the U-shaped section for use in riding over solid ground, with the sled reversed to slide on its other side over snow or sand.

3 Claims, 3 Drawing Figures

U.S. Patent  Dec. 23, 1975  3,927,894
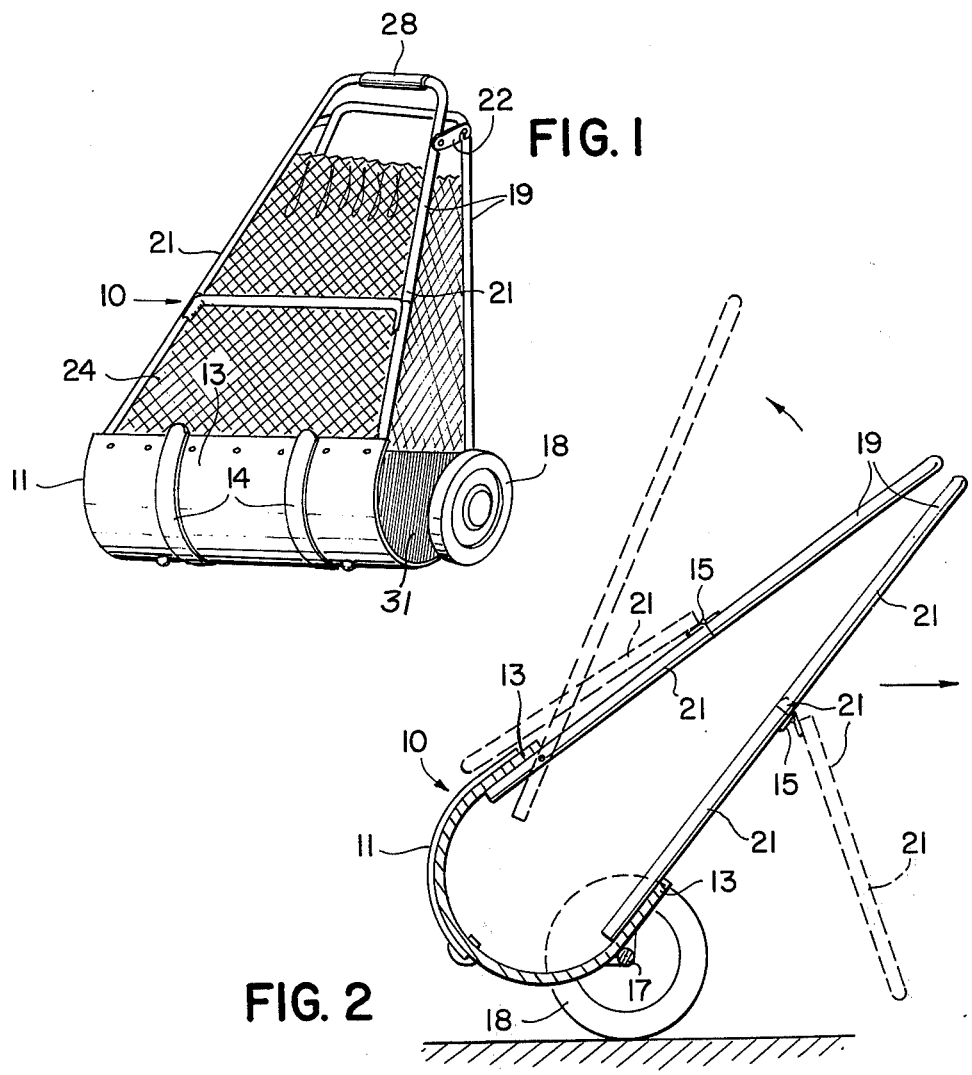
FIG. 1
FIG. 2
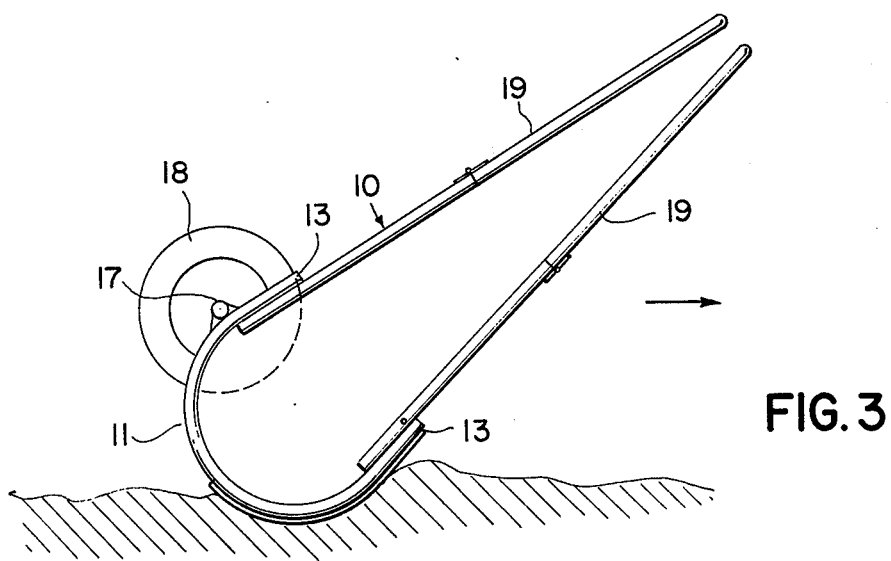
FIG. 3

BEACH AND SNOW SLED

SUMMARY OF THE INVENTION

My invention relates to a sled that may be employed for the transportation of packages on sand or snow ground and alternately rolled on solid ground.

The package carrying section of the sled comprises a U-shaped basket of sheet material fitted at each end to handle frame. A set of wheels are fastened on one external side of the basket section and a set of skids fastened on the other side of the basket section.

BRIEF DESCRIPTION OF THE DRAWING

The objects and features of the invention may be understood with reference to the following detailed description of an illustrative embodiment of the invention, taken together with the accompanying drawings in which:

FIG. 1 illustrates a perspective view of the invention;

FIG. 2 illustrates a side view of the invention as rolled on solid ground; and

FIG. 3 illustrates a side view of the invention as skidded on sand or snow.

DESCRIPTION OF THE PREFERRED EMBODIMENT

Turning now descriptively to the drawings, in which similar reference characters denote similar elements throughout the several views, FIGS. 1–3 illustrate the luggage 10 which is formed of a cart section 11 of sheet material shaped in the form of a U-section enclosed by sides 31 with a pair of wheels 18 rotatably fastened to an axle 17 fixed on one side of the cart section 11, with skids 14 fixed to the external surface of the other side of the cart section.

A handle frame section 19 is fixed to each end portion 13 of the cart section 11, with each handle frame section 19 formed of tubing members 21 that enclose a sheet of netting 24 so that each sheet of netting extends the sheeting of the cart section 11, and encloses the ends of the handle frame section. Both handle frame sections 19 may be joined together by a catch 22 so that the handles frame members 19 are held together in the assembled condition.

The tubing lengths 21 of each handle frame member 19 may be joined by hinges 15 so that the device may be folded when not in use.

As shown in FIGS. 1–2, the device 10 may be rolled on wheels 18 or turned over to be pulled or pushed on skids 14 over snow or sand.

Handle frame members 19 may be rotatably fastened to the end sections 13 of the cart section 11 and a handle tube 28 may be mounted over the gripping portion of a handle frame 19.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A cart for sliding over sand or snow which may be alternately rolled over solid ground comprising
    a cart section formed of sheet material, said cart section being shaped as an upwardly open-ended U-section,
    a pair of tubular handle frame units each fastened to a respective upper end of said U-section, of the cart with netting fastened to the respective handle frame units to extend from the walls of the cart section,
    a pair of wheels externally mounted to a first side of the cart section, and
    a skid mounted externally on the second side of the cart section.

2. The combination as recited in claim 1 together with a catch member which may fasten both handle frame members together.

3. The combination as recited in claim 2 in which at least one of said handle frame units is formed of lengths of tubing, with hinges employed to join a plurality of said lengths of tubing so that each handle frame section may be folded together, when not in use.

* * * * *